H. P. WOODMAN.
GASOLENE GAGE.
APPLICATION FILED FEB. 10, 1916.
1,234,597.
Patented July 24, 1917.
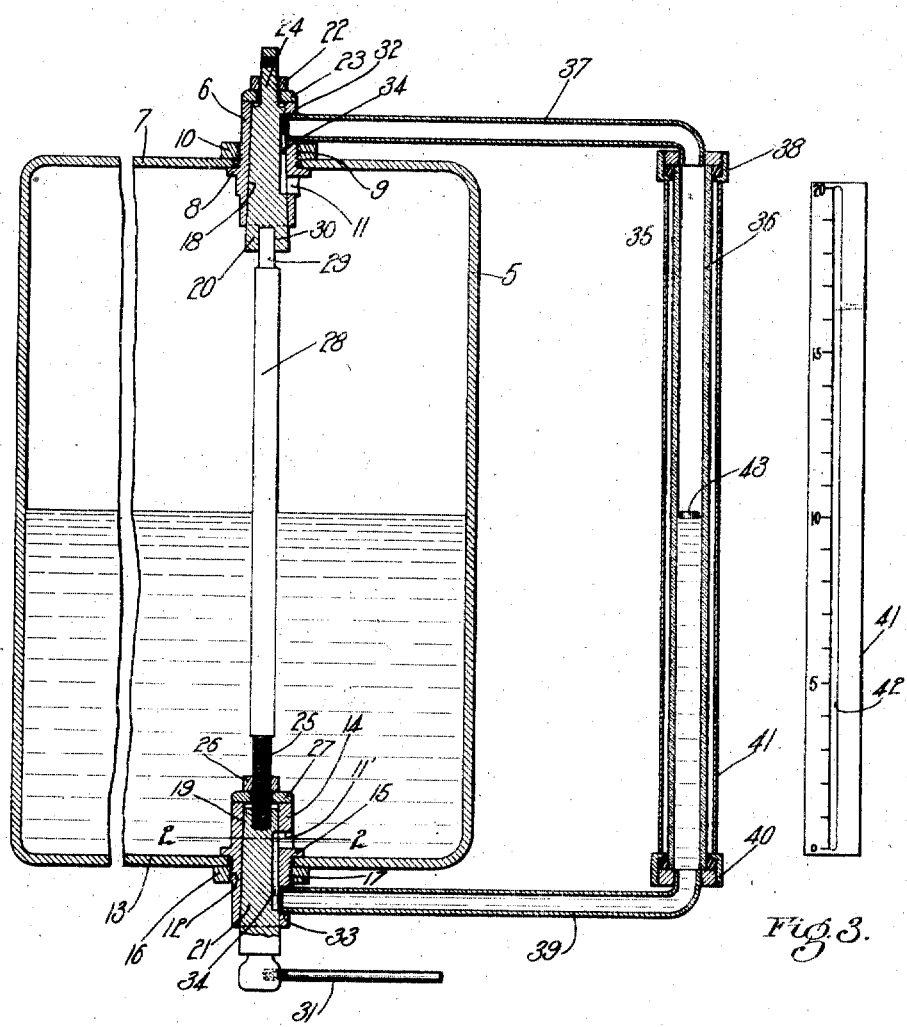
Fig. 1.
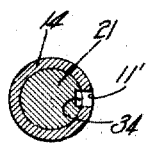
Fig. 2.
Fig. 3.
Inventor:
Horace P. Woodman

UNITED STATES PATENT OFFICE.

HORACE P. WOODMAN, OF BENNINGTON, VERMONT.

GASOLENE-GAGE.

1,234,597.

Specification of Letters Patent.

Patented July 24, 1917.

Application filed February 10, 1916. Serial No. 77,478.

*To all whom it may concern:*

Be it known that I, HORACE P. WOODMAN, a citizen of the United States, residing at Bennington, in the county of Bennington and State of Vermont, have invented new and useful Improvements in Gasolene-Gages, of which the following is a specification.

This invention relates to liquid level indicators, and is particularly, though not exclusively, adapted for use in connection with gasolene receptacles or tanks.

The invention has for its object to provide a simple and inexpensive means for accurately determining the level of the gas within the tank and is adapted to be rendered inoperative when inspection thereof is not desired.

The invention consists in the combination and arrangement of parts set forth in the following specification and particularly pointed out in the claims.

Referring to the drawings:

Figure 1 is a vertical section through a liquid receptacle and indicator embodying this invention, portions of said receptacle being broken away to save space in the drawings.

Fig. 2 is a section taken on the line 2—2 of Fig. 1.

Fig. 3 is a front elevation of the indicating tube protector.

Like numerals refer to like parts in all views of the drawings.

In the drawings, 5 is a receptacle or tank for containing liquid such as gasolene. A valve casing 6 is secured to said receptacle 5 adjacent to the upper portion thereof, preferably through the top 7 of said receptacle, said casing having a flange 8 adapted to engage one face of said top. Screw threads 9 are also provided upon the outer surface of said casing and are engaged by a collar or nut 10 which is adapted to be screwed against the opposite face of said top from that engaged by the flange 8 and thus securely fasten said casing to the receptacle.

The casing 6 protrudes into the receptacle for a considerable portion of its length and has in its side wall a lateral orifice 11 communicating with the interior of said receptacle. A second valve casing 12 is secured to said receptacle adjacent to the lower portion thereof, preferably in the bottom 13, a portion 14 of said casing protruding into said receptacle.

A flange 15 is provided on said casing to seat against the inner face of said bottom 13. A collar or nut 16 has screw threaded engagement with said casing at 17 and engages the lower face of the bottom 13, thus securely fastening said casing to the receptacle. The casings 6 and 12 are provided with co-axially arranged tapered bores 18 and 19 respectively, within which are adapted to fit co-axially arranged tapered valves 20 and 21 respectively.

The valve 20 is arranged to be held firmly within and against its valve seat by a nut 22 and washer 23, said nut having screw threaded engagement with a screw threaded portion 24 of said valve. The lower valve 21 is adapted to be held firmly against the seat, preferably by means of a screw 25 which has screw threaded engagement with the smaller end of said valve and is held in position with relation thereto by a nut 26 and washer 27, in the usual well known manner.

The screw 25 is preferably an integral part of a rod 28 which extends upwardly and has at its upper end a reduced squared portion 29 adapted to fit into a corresponding socket 30 in the large end of the valve 20, whereby when one of the valves is rotated the other valve will be rotated simultaneously therewith. The lowermost valve 21 is provided with a handle 31 by means of which said valve may be rotated when desired. The handle 31 may be attached to the portion 24 of the valve 20 if desired.

Considerable portions of the valve casings 6 and 12 project beyond the portions of the receptacle to which they are attached and each of said casings is provided with a laterally disposed orifice 32 and 33 respectively. The orifice 32 is located in the projecting portion of the casing 6.

The valves 20 and 21 are each provided with a longitudinally arranged peripheral groove 34 disposed so as to connect at certain times in the operation of the device the orifices 11 and 32 in the casing 6 and the orifices 11' and 33 in the casing 12.

A liquid level indicating tube 35 is connected at its upper end with the orifice 32 and at its lower end with the orifice 33 and is constructed and arranged to communicate with the interior of the receptacle 5 when the grooves 34, 34 are alining with their respective orifices. The tube 35 preferably consists of a transparent section 36, preferably glass, which is connected at its upper end to the valve casing 6 by a metallic connecting tube 37 joined to said transparent tube by a union 38.

The lower end of the tube is connected with the casing 12 by a metallic tube 39 joined to said tube 36 by a union 40. A protector tube 41 surrounds the glass tube 36 between the unions 38 and 40 and has in the front face thereof a slot 42 extending longitudinally thereof for the greater portion of its length, in order to permit the level of the liquid within said tube to be visible from the exterior thereof.

A float 43 is arranged within the transparent section 36 so as to enable the observer to more readily determine the level of the liquid therein. When it is desired to determine the level of the liquid within the receptacle 5 the handle 31 of the lower valve 21 is moved until the grooves 34 in both of the valves aline with their respective orifices, thereby permitting the liquid in the receptacle to flow therethrough into the indicator tube and seek a level which is equal to the level of the liquid within the receptacle.

This may be left open during the filling of the receptacle or it may be opened each time the operator wishes to determine how much liquid or fuel there is in the tank but at other times it is desirable that the valves be closed, and therefore the handle is turned so as to shut off all communication between the indicator tube and the receptacle, thus in case of a collision or accident which might destroy or damage the glass tube 36, none of the oil within the receptacle 5 would be permitted to escape. By connecting the two valves 20 and 21 together, the simultaneous operation of them both will be assured.

The protector tube 41 is preferably graduated to indicate the number of gallons in the tank.

Having thus described my invention what I claim and desire by Letters Patent to secure is:

1. The combination of a liquid receptacle, a valve casing secured to said receptacle adjacent to the bottom thereof, a portion of said casing protruding into said receptacle and provided with an orifice communicating with the interior of said receptacle, a liquid level indicating tube connected with said casing, and a rotary valve arranged in said casing and provided with a longitudinal peripheral groove adapted to connect said orifice with said tube, whereby communication between said tube and said receptacle may be had.

2. The combination of a liquid receptacle, a valve casing attached to said receptacle adjacent to the bottom thereof, a portion of said valve casing protruding into said receptacle and a portion thereof projecting from said receptacle, both the protruding and the projecting portions of said casing having a laterally disposed orifice, a liquid level indicating tube having communication with the top of said receptacle and through the orifice in the projecting portion of said valve casing, and a rotary valve arranged in said casing and provided with a longitudinal peripheral groove adapted to connect together the orifices in the projecting and protruding portions of said casing, whereby liquid will be permitted to flow from said receptacle to said tube.

3. The combination of a liquid receptacle, a valve casing attached to said receptacle adjacent to the bottom thereof, a portion of said valve casing protruding into said receptacle and provided with an orifice communicating with the interior of said receptacle, a second valve casing attached to said receptacle adjacent to the top thereof and having a portion protruding into said receptacle, said protruding portion having an orifice communicating with the interior of said receptacle, a level indicating tube connected with said upper and lower valve casings exteriorly of said receptacle, rotary valves arranged in said casings with their axes substantially in alinement with each other, said valves being adapted to open and close communication between said receptacle and said tube, and means extending through said receptacle to operatively connect said valves together adapted to produce a simultaneous movement thereof.

In testimony whereof I have hereunto set my hand in presence of two subscribing witnesses.

HORACE P. WOODMAN.

Witnesses:
CHARLES S. GOODING,
CHARLES S. KEHOE.